May 20, 1924.
M. S. KUBIAK
1,495,084
HOLDER FOR STARTING CRANKS
Filed May 28, 1923
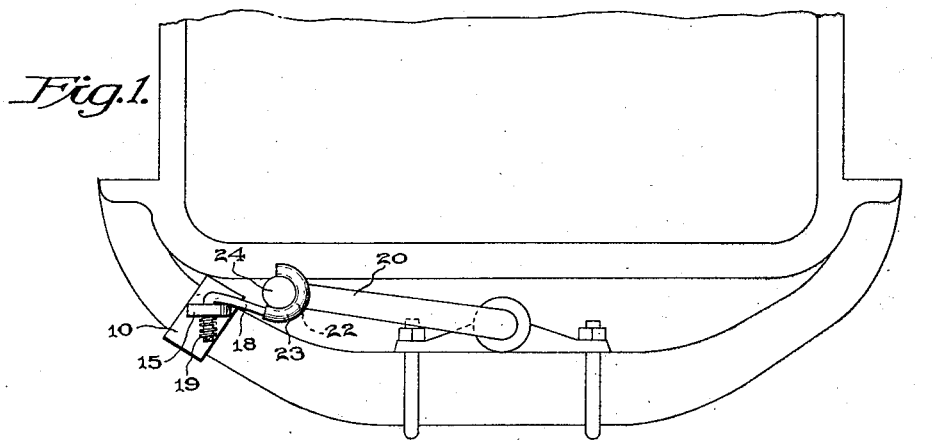
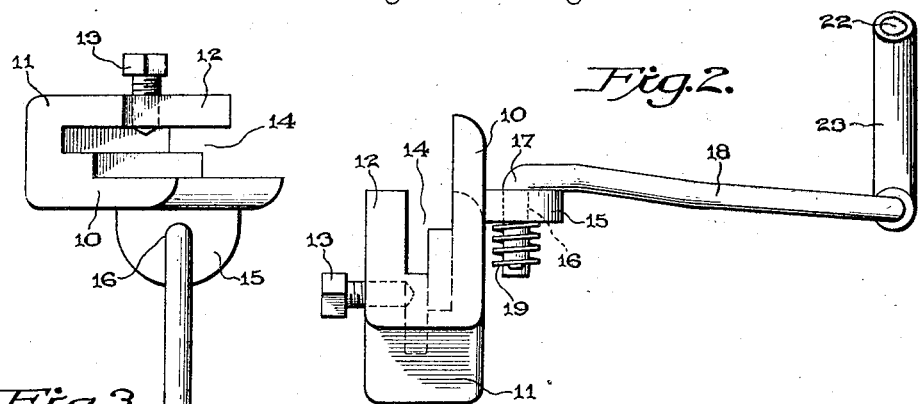
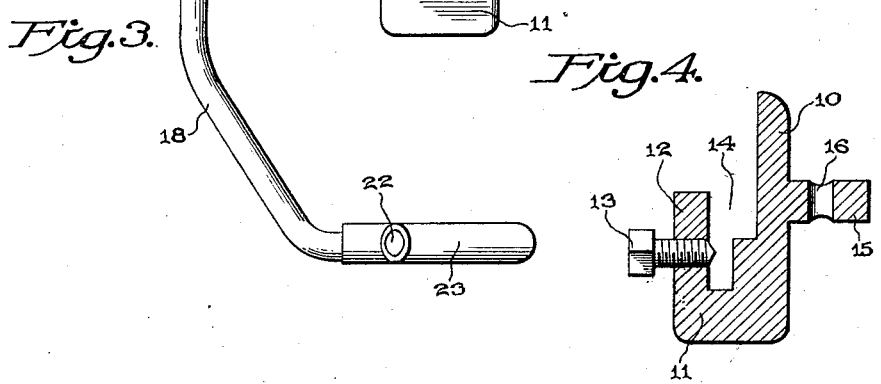
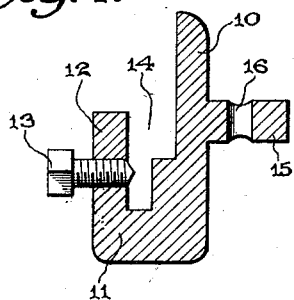
Martin S. Kubiak
INVENTOR
BY Victor J. Evans
ATTORNEY
WITNESS:
H. A. LaClair Patented May 20, 1924.

1,495,084

UNITED STATES PATENT OFFICE.

MARTIN S. KUBIAK, OF BUFFALO, NEW YORK.

HOLDER FOR STARTING CRANKS.

Application filed May 28, 1923. Serial No. 642,019.

*To all whom it may concern:*

Be it known that I, MARTIN S. KUBIAK, a citizen of the United States, residing at Buffalo, in the county of Erie and State of New York, have invented new and useful Improvements in Holders for Starting Cranks, of which the following is a specification.

The object of the invention is to provide means for holding the starting crank of a Ford automobile, in horizontal position, in order to keep it from rattling and in order that it may present a satisfactory appearance.

A further object is to provide a bracket especially proportioned to fit the front frame member of an automobile of this type, and a spring held arm to be carried by the bracket, in position for holding the crank, but permitting the easy release of the latter for starting purposes.

With the foregoing and other objects in view, the invention consists in the novel construction and arrangement of elements, described, illustrated and claimed, it being understood that modifications may be made within the scope of the claims without departing from the spirit of the invention.

In the drawings, Figure 1 shows the device in front elevation as applied to the front element of a car frame; Figure 2 is an elevation of the device detached, and from another angle; Figure 3 is a view in top plan; Figure 4 is a section of the clamping bracket.

In carrying out the invention, I provide a bracket including a front portion 10, a lower portion 11, and a rear portion 12, the latter being threaded for the accommodation of a set screw 13. The recess or opening 14 is proportioned to permit the bracket to pass around the front element of the frame, at the point shown, the set screw holding the bracket in a fixed position.

A projecting element 15 is apertured as shown at 16 and receives the end portion 17 of an arm 18. The portion 17 is bent at approximately right angles with the main portion of the element 18, and a coiled spring 19 encircles the bent end 17 between the ends thereof and the projecting elements 15 and provides for the resilient mounting of the arm which is maintained in approximately horizontal position, in order to hold the starting crank 20 in a horizontal position.

The arm includes a hook portion 22 encircled by a sheet of rubber tubing 23 which directly engages the handle portion 24 of the crank, thereby preventing metallic contact, and rattling or the like. The device is applied to the frame at the left of the operator as he stands facing the car, in position for cranking the engine.

What is claimed is:

1. In a device of the class described, a bracket for connection with an automobile main frame, a projecting element carried by the bracket, an arm including a deflected end member, the end passing loosely through the projecting element, and a spring for resiliently retaining the arm with reference to said element.

2. In a device of the class described, a bracket proportioned to fit around an element of an automobile frame, securing means for said bracket, a projecting element carried by the bracket, an arm having one end deflected and passing through the projecting element, a spring encircling the end portion of the arm adjacent to the projecting element and providing for the resilient mounting of said arm, the arm including a hook portion, and a non-metallic element surrounding the hook end.

In testimony whereof I affix my signature.

MARTIN S. KUBIAK.